United States Patent [19]

Naritomi

[11] Patent Number: 5,695,699
[45] Date of Patent: Dec. 9, 1997

[54] HETEROGENOUS FOAM INJECTION MOLDING METHOD

[75] Inventor: Masanori Naritomi, Urayasu, Japan

[73] Assignee: Taisei Plas Co., Ltd., Tokyo, Japan

[21] Appl. No.: 701,071

[22] Filed: Aug. 21, 1996

Related U.S. Application Data

[63] Continuation of Ser. No. 314,262, Sep. 30, 1994, abandoned.
[51] Int. Cl.[6] ................................................. B29C 44/06
[52] U.S. Cl. ..................... 264/46.4; 264/45.1; 264/255; 264/328.7
[58] Field of Search .................. 264/45.1, 46.4, 264/46.6, 328.7, 255, 55

[56] References Cited

U.S. PATENT DOCUMENTS

| | | | |
|---|---|---|---|
| 3,793,415 | 2/1974 | Smith | 264/328.7 |
| 3,809,733 | 5/1974 | Sandiford et al. | 264/328.7 |
| 4,389,358 | 6/1983 | Hendry | 264/328.7 |
| 5,281,376 | 1/1994 | Hara et al. | 264/46.4 |
| 5,292,465 | 3/1994 | Kobayashi et al. | 264/46.4 |
| 5,308,559 | 5/1994 | Baracchi et al. | 264/46.4 |

*Primary Examiner*—Allan R. Kuhns
*Attorney, Agent, or Firm*—Armstrong, Westerman, Hattori, McLeland & Naughton

[57] ABSTRACT

A primary molding material is injected into a primary cavity with a predetermined volume formed by mold elements for primary injection molding which are movable relative to each other, and the mold elements are moved away from each other to increase the volume of the primary cavity by a predetermined amount. In this state, the primary molding material is foamed to form a primary molded part. Then, one of the mold elements for primary injection molding is replaced by a secondary injection mold element including a movable mold element, and a secondary molding material is injected into a secondary cavity formed by the primary molded part, the secondary injection mold element, and the movable mold element for secondary injection molding. Then, the movable mold element is moved backward to increase the volume of the secondary cavity by a predetermined amount, and the secondary molding material is foamed to form a secondary molded part as an integral part of the primary molded part, thereby producing a material or product of stable quality at low cost which simultaneously has elasticity, flexibility, cushioning properties and toughness.

1 Claim, 15 Drawing Sheets

HETEROGENOUS FOAM INJECTION MOLDING METHOD

This application is a continuation of application Ser. No. 08/314,262 Sep. 30, 1994, now abandoned.

BACKGROUND OF THE INVENTION

The present invention relates to a foam injection molding method wherein high-expansion ratio foaming is effected in a mold. More particularly, the present invention relates to a foam injection molding method wherein high-expansion ratio foaming of a heterogeneous molding material is effected in a mold under control by expanding the cavity at a plurality of stages, with the cavity kept closed, by moving a mold element at a plurality of steps.

Plastics can be newly given various properties by foaming them. Particularly, the following various properties can be imparted to plastics by foaming: heat insulating, sound absorbing, vibration damping, buoyant, elastic, lightweight, liquid guiding, dust-resistant (filtering), friction and non-slip properties. Many foam moldings have recently been employed for various purposes by making use of these properties. It is expected that there will be an increase in the demand for composite moldings incorporating a foamed molded part in a part thereof to utilize the above-described properties In particular, by integrating foamed parts of different materials into one article, it will be possible to synergistically utilize the physical properties of each foamed part. For example, a damper of an automotive air conditioner is demanded to simultaneously have cushioning properties, sound absorbing properties, flexibility and toughness because it is used under vibratory environmental conditions, frequently opened and closed and moves violently, and is, therefore, likely to collide with other objects frequently. When such an automotive air conditioner damper is formed as a single foamed article, however, it is, in many cases, expected to be difficult to give it cushioning properties and toughness simultaneously, which may be contradictory to each other.

At present, foaming is carried out mainly by injection molding and extrusion. Injection molding, which is superior to extrusion in moldability, is a method wherein a relatively small amount of molding material containing a blowing agent is injected into a cavity in a mold under low pressure, and the cavity is filled with the molding material by foaming caused by the blowing agent. As the blowing agent, a low-boiling point petroleum solvent may be used, but an azodicarbonamide or oxybissulfonyl hydrazide compound is generally employed.

Such a foam injection molding method allows only homogeneous foam moldings to be formed and has difficulty in controlling the amount of molding material injected because the molding material is foamed in the cavity with a fixed volumetric capacity to fill it. Accordingly, moldings produced by foaming are generally low-expansion ratio molded parts; no molded parts of high-expansion ratio can be obtained by the above-described injection molding method. Further, it is difficult to meet the demand for a foamed part to simultaneously exhibit a plurality of different physical properties.

FIGS. 1 and 2 show a known high-expansion ratio injection molding method. As shown in FIG. 1, the conventional injection molding method employs an injection mold composed of two mold elements, i.e., a stationary mold element 01 and a movable mold element 02. The movable mold element 02 is slidable relative to the stationary mold element 01. As shown in FIG. 1, an initial cavity 03 is formed by the two mold elements 01 and 02. The initial cavity 03 is rapidly filled with a molding material containing a blowing agent. Immediately after the filling process, the movable mold element 02 is moved backward relative to the stationary mold element 01 to enlarge the cavity volume, thereby forming a final cavity 04 as shown in FIG. 2.

The charged molding material is foamed in the expanded cavity 04, formed as described above. This foam injection molding method enables the expansion ratio to be increased. In other words, the described foam injection molding method enables high-expansion ratio foaming.

The above-described conventional method, in which the cavity is expanded by moving two mold elements relative to each other to effect high-expansion ratio foaming, suffers, however, from the following two problems: The first problem is that the conventional method allows only homogeneous foamed parts to be produced, which are formed of a single, homogeneous material. The second problem is that the interfaces a and b of the cavity expansion that is added to the initial cavity 03, that is, the cavity portion that remains when the initial cavity 03, which is shown in FIG. 1, is subtracted from the final cavity 04, which is shown in FIG. 2, are limited to surfaces S, as shown in FIG. 3, which are formed by scanning movement of the line L of intersection of the cavity forming surface A of the stationary mold element 01 and the cavity forming surface C of the movable mold element 02 having a sliding surface B that slides on the cavity forming surface A. Accordingly, the degree of freedom of the final shape that can be given to the foamed part is limited to a considerably low level.

More generally, when only two mold elements are employed, it is impossible to have a cavity interface that disables the initial cavity 03, which is formed by the two mold elements, from being shifted to the final cavity 04 by moving the two mold elements relative to each other while keeping the cavity closed.

A cavity interface with which the initial cavity 03 cannot be shifted to the final cavity 04 with the cavity kept closed is such that a portion of the cavity forming surface A in the vicinity of the line L of intersection of the two cavity forming surfaces A and C of the two mold elements 01 and 02, which form the closed cavity 03 when they are joined together, is formed from a surface that is not parallel to the direction of movement of the two mold elements 01 and 02.

Since the foam injection molding method that employs only two mold elements suffers from the above-described restriction, it is impossible to form three-dimensional molded parts of high-expansion ratio whose interfaces have neither parallel sliding surfaces nor a surface consisting of a set of parallel lines, for example, a spherical part having a spherical interface, an annular part, such as a doughnut-shaped part, which has a torus interface, a polyhedron, such as a regular tetrahedron, in which any two of the four interfaces are not parallel to each other, a conical part, or a complicated three-dimensional part, such as a tetrapod, which consists of a combination of a plurality of conical surfaces, although it is possible to form a three-dimensional object, e.g., a circular cylinder, which has an interface consisting of a set of parallel lines, by a high-expansion ratio injection molding process.

SUMMARY OF THE INVENTION

It is an object of the present invention to provide a heterogeneous foam injection molding method whereby a composite heterogeneous foam injection-molded part is formed in a single mold from molding materials having different physical properties.

It is another object of the present invention to provide a heterogeneous foam injection molding method whereby a composite heterogeneous foam injection-molded part is formed in a single mold from molding materials having different physical properties with a high degree of freedom of configuration.

To attain the above-described objects, the present invention provides a heterogeneous foam injection molding method including the steps of: forming a secondary initial cavity (35) by using at least two mold elements (13 and 14) and a primary injection-molded part (32); injecting a secondary molding material different from a material of the primary injection-molded part (32) into the secondary initial cavity (35) formed by the secondary initial cavity forming step; and forming a secondary final cavity (36) having a larger volumetric capacity than that of the secondary initial cavity (35) by moving at least one of the at least two mold elements (13 and 14) relative to the other mold element while keeping the cavity closed, and foaming the charged molding material in the secondary final cavity (36).

In the above-described heterogeneous foam injection molding method, the primary injection-molded part (32) may be a foam injection-molded part formed by the steps of: forming a primary initial cavity (30) by using at least two mold elements (53 and 54); injecting a primary molding material into the primary initial cavity (30) formed by the primary initial cavity forming step; and forming a primary final cavity (31) having a larger volumetric capacity than that of the primary initial cavity (30) by moving one of the at least two mold elements (53 and 54) relative to the other mold element while keeping the cavity closed, and foaming the charged molding material in the primary final cavity (31).

In the above-described heterogeneous foam injection molding method, the primary injection-molded part (32) may be a foam injection-molded part formed by the steps of: forming a primary initial cavity (30) by using at least three mold elements (13, 14 and 15); injecting a primary molding material into the primary initial cavity (30) formed by the primary initial cavity forming step; and forming a primary final cavity (31) having a larger volumetric capacity than that of the primary initial cavity (30) by moving one of the at least three mold elements (13, 14 and 15) relative to the other mold elements while keeping the cavity closed, and foaming the charged molding material in the primary final cavity (31).

In addition, the present invention provides a heterogeneous foam injection-molded part which is formed by fusion-bonding together bubbles of at least two foam injection-molded parts formed of materials different from each other during foam injection molding of one of the foam injection-molded parts.

In the above-described heterogeneous foam injection-molded part, the material of one of the foam injection-molded parts may be a rigid thermoplastic engineering plastic material, and the material of the other foam injection-molded part may be a thermoplastic elastomer.

It should be noted that the reason why reference numerals are put to the constituent elements in the above-described arrangements is for the sake of clarifying the association between the constituent elements and the corresponding elements in embodiments described hereinbelow, and that the present invention is not limited to the following embodiments.

According to the heterogeneous foam injection molding method of the present invention, a primary molding material is quantitatively foamed to form a primary molded part by a core-back method wherein a mold element that belongs to one part of an injection mold and that is movable relative to this mold part is moved backward. Next, a secondary molding material is quantitatively foamed so as to join to the primary molded part by the core-back method, thereby forming a secondary molded part, and thus producing an integral heterogeneous (multi-color) molded part composed of the primary and secondary molded parts. By fusion-bonding together the primary and secondary molded parts formed of different materials, it is possible to produce a material or product having the toughness of the primary or secondary molded part as a whole in addition to the elasticity, flexibility and cushioning properties of the secondary or primary molded part. In general, it is possible to produce a foamed material or product which has the properties of both the primary and secondary molded parts of different materials.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DETAILED DESCRIPTION OF THE PREFERRED EMBODIMENTS:

Embodiments of the present invention will be described below in detail with reference to the accompanying drawings.

First Embodiment

Figure 8:
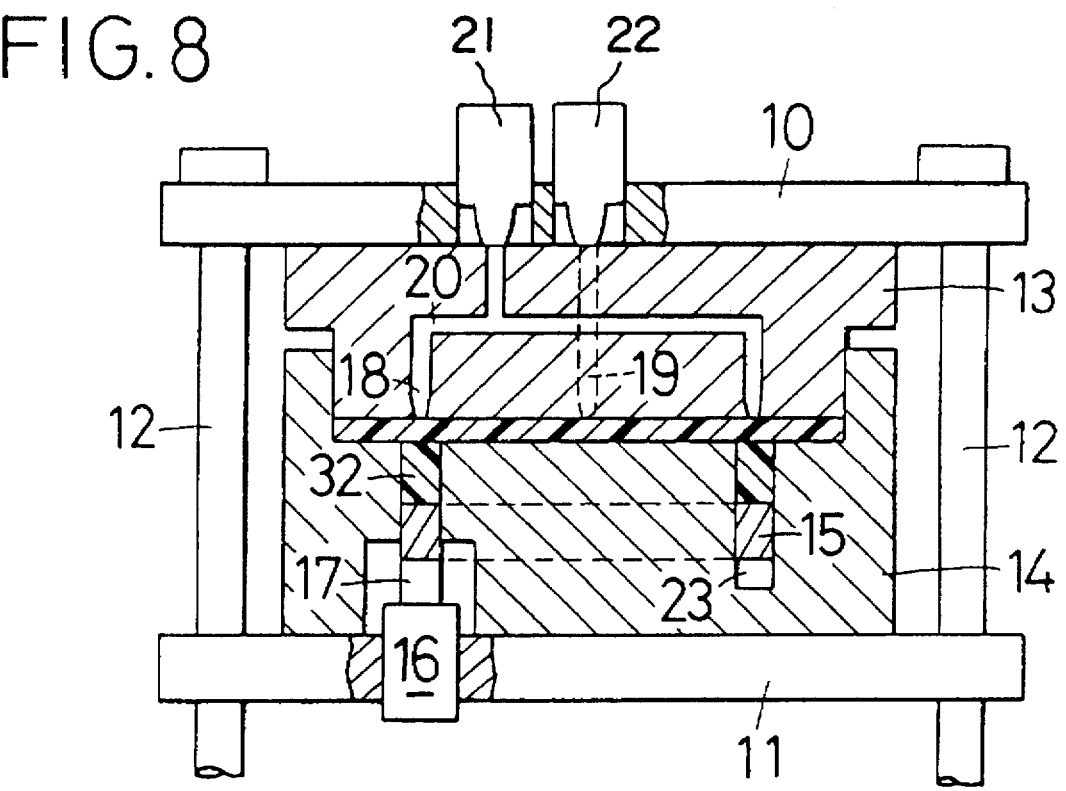
FIG. 8 is a sectional front view showing a still further step of the first embodiment of the heterogeneous foam injection molding method according to the present invention.
Figure 9:
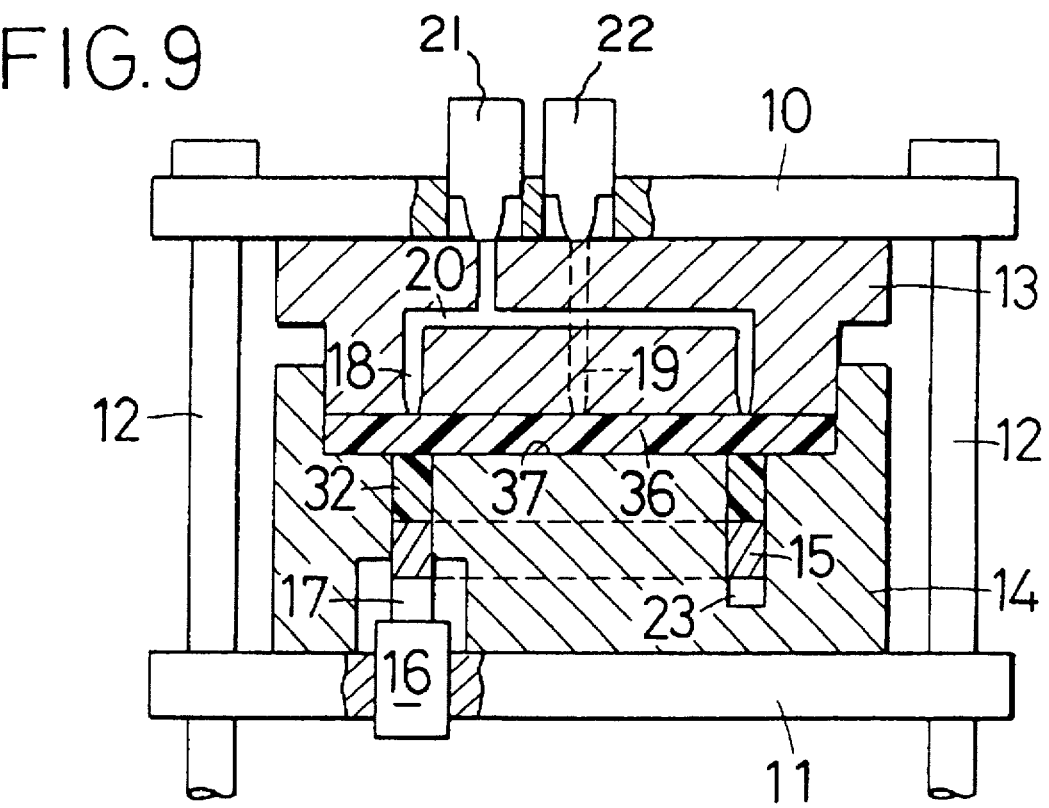
FIG. 9 is a sectional front view showing a still further step of the first embodiment of the heterogeneous foam injection molding method according to the present invention.
Figure 10:
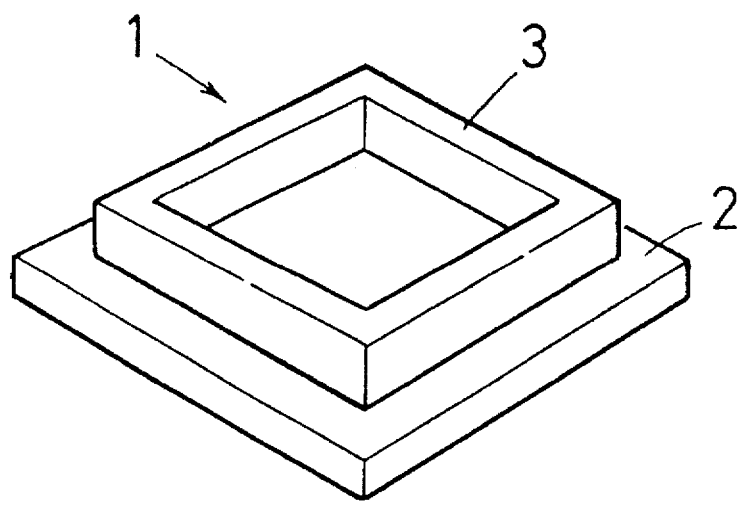
FIG. 10 is an oblique projection of an example of an article produced by the heterogeneous foam injection molding method according to the present invention.

FIGS. 4 to 9 are sectional front views showing the operation of a fundamental injection molding device for carrying out the heterogeneous foam injection molding method of the present invention as a first embodiment according to the process sequence. FIG. 10 shows a damper 1 of an automotive air conditioner which is produced by this embodiment. As shown in FIG. 10, the damper 1 is composed of a damper body 2 and a cushioning member 3. The cushioning member 3 is integrally formed in the shape of an annular square on one side of the damper body 2, which has a plate-like configuration.

The damper body 2, which is required to have toughness, is formed by using a rigid engineering plastic material, e.g., nylon, PP, etc. The cushioning member 3, which is required to have elasticity, is formed by using a thermoplastic elastomer. Examples of thermoplastic elastomers usable in the present invention include well-known molding materials such as urethane elastomers, olefin elastomers, diene elastomers, plasticized vinyl chloride, etc., which may contain a polyether block amide or a polyester thermoplastic elastomer. These engineering plastics and thermoplastic elastomers are mixed with a blowing agent.

Figure 1:
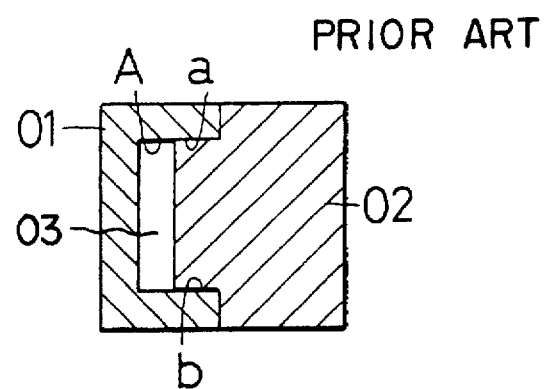
FIG. 1 is a sectional front view showing a first step of a known foam injection molding method.
Figure 2:
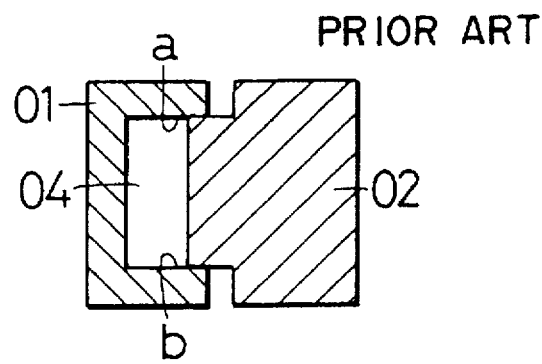
FIG. 2 is a sectional front view showing another step of the known foam injection molding method shown in FIG. 1.
Figure 3:
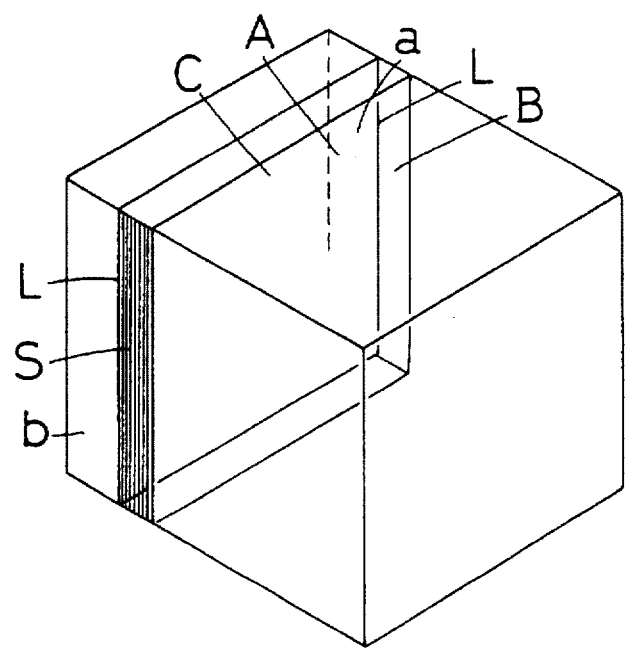
FIG. 3 is an oblique projection for explanation of the restriction on the configuration of molded parts formed by the known foam injection molding method.
Figure 4:
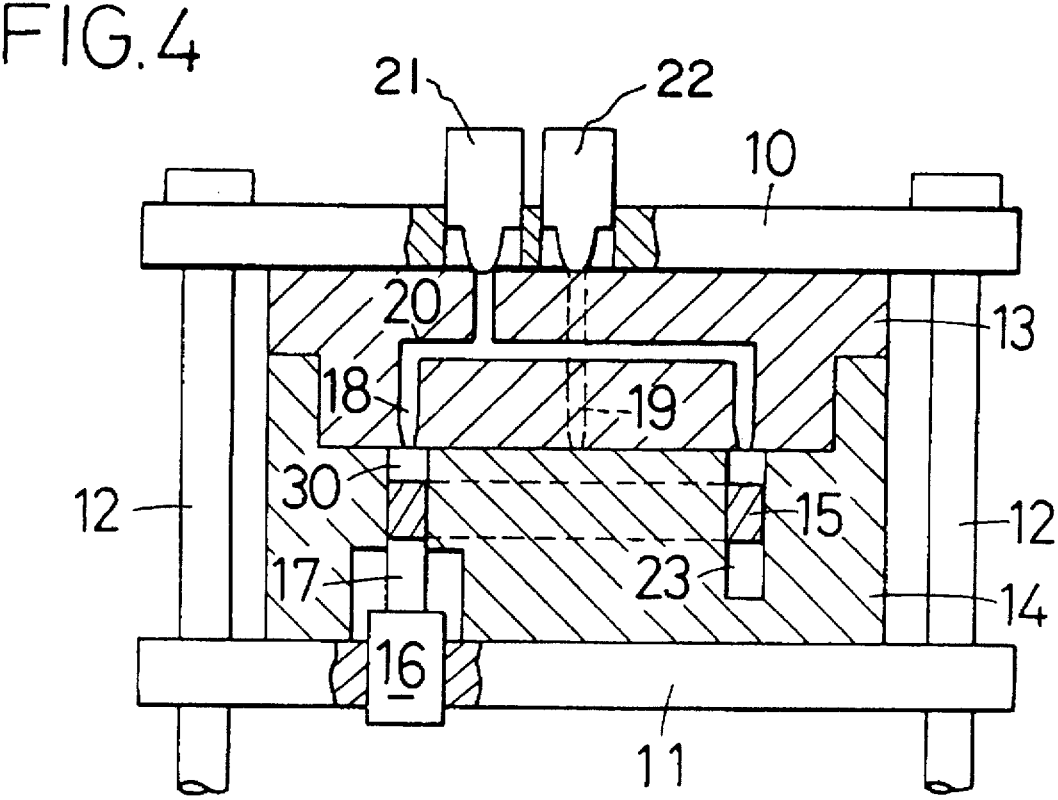
FIG. 4 is a sectional front view showing a first step of a first embodiment of the heterogeneous foam injection molding method according to the present invention.

As shown in FIG. 4, a conventional injection molding machine is used for foaming process. The injection molding machine has a stationary platen 10, a movable platen 11, and a plurality of guide rods 12 for guiding the movement of the movable platen 11. The movable platen 11 is disposed to face the stationary platen 10 and driven by a hydraulic cylinder (not shown) to move forward and backward relative to the stationary platen 10.

The injection mold is basically composed of three elements, that is, a mold element 13, a mold element 14, and a mold element 15. The mold element 13 is attached to the stationary platen 10. The mold element 14 is attached to the movable platen 11. The mold elements 13 and 14 are movable relative to each other. For the convenience of describing the embodiment, the mold element 13 will be referred to as a mold element on the stationary side, and the mold element 14 as a mold element on the movable side.

The mold element 14 or the movable platen 11 is provided with a pneumatic cylinder 16. The top of a piston rod 17 of the pneumatic cylinder 16 is attached to the mold element 15. The mold element 15 is slidably guided in the mold element 14. The mold element 13 is provided with a primary gate 18 and a secondary gate 19. The primary gate 18 is connected to an injection nozzle of a primary injection pipe 21 through a runner 20. The secondary gate 19 is connected to an injection nozzle of a secondary injection pipe 22.

The mold element 15 is an annular square cylindrical member. The mold element 15 having such a configuration is inserted into an annular groove 23 provided in the mold element 14. The annular groove 23 is open on the end surface of the mold element 14 that faces the mold element 13.

Figure 5:
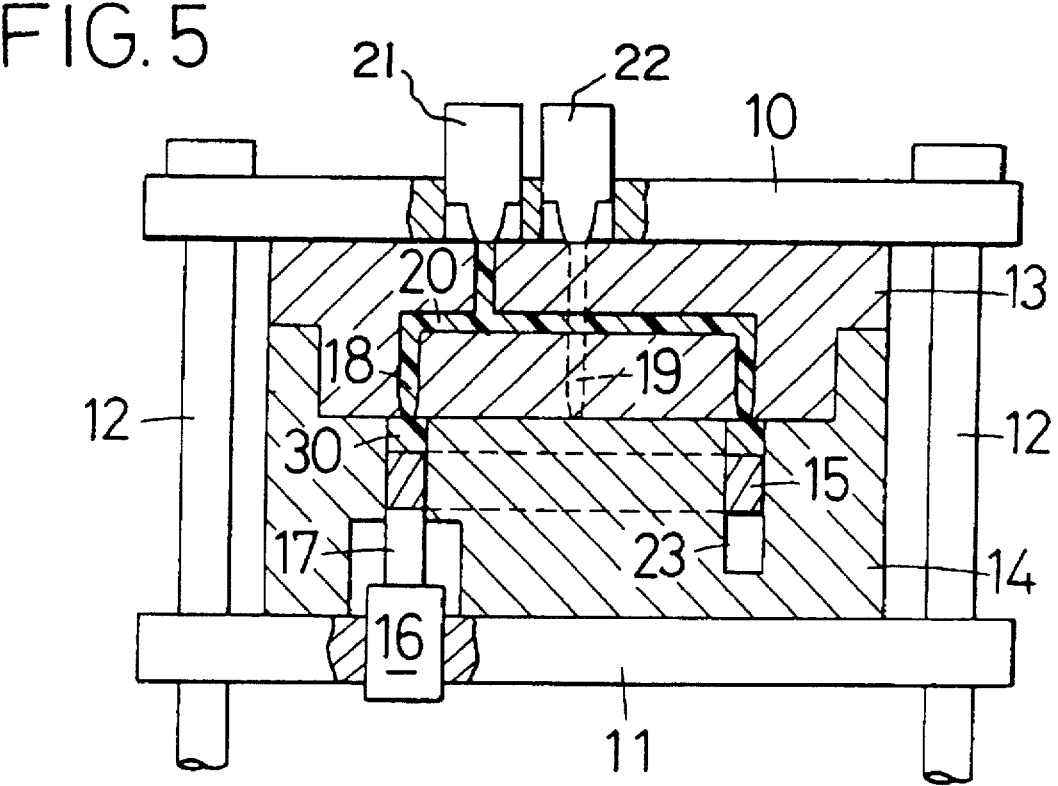
FIG. 5 is a sectional front view showing another step of the first embodiment of the heterogeneous foam injection molding method according to the present invention.

FIG. 4 shows an initial cavity forming step of the heterogeneous foam injection molding process. An annular primary initial cavity 30 is formed by the end surface of the mold element 13 that faces the mold element 14, the peripheral surfaces of the mold element 14 that define the annular groove 23, and the end surface of the mold element 15 that faces the mold element 13. As shown in FIG. 5, a primary molding material containing a blowing agent is injected into the primary initial cavity 30 from the injection nozzle of the primary injection pipe 21 through the runner 20 and the primary gate 18.

Figure 6:
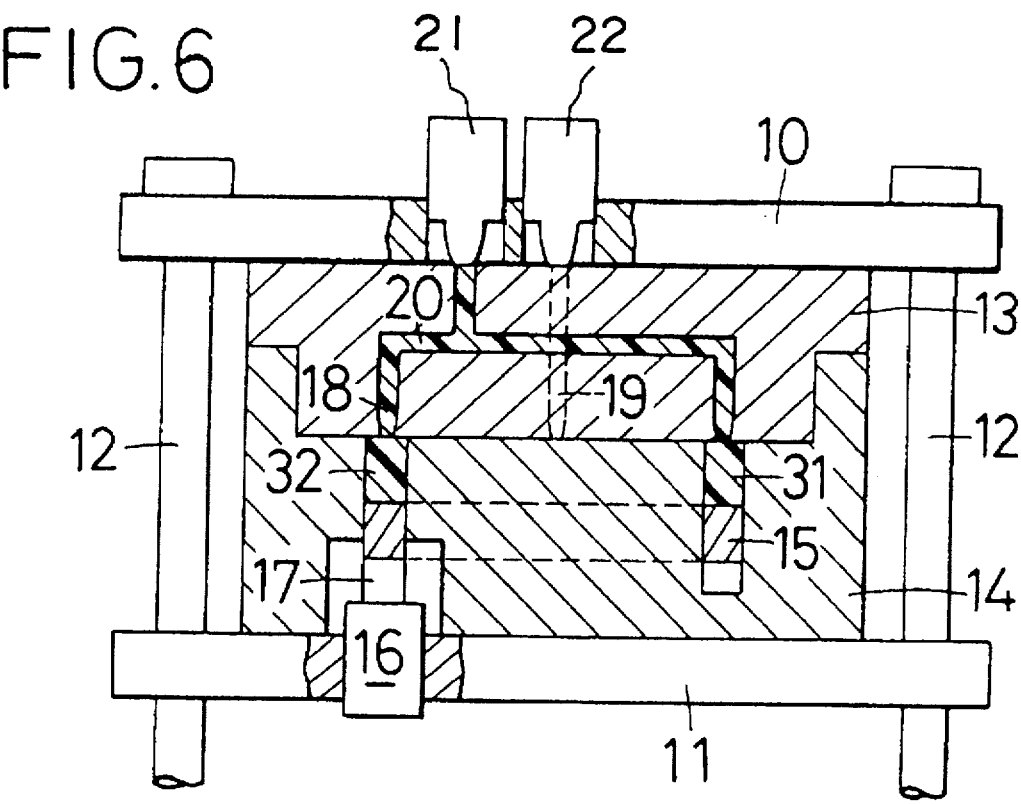
FIG. 6 is a sectional front view showing still another step of the first embodiment of the heterogeneous foam injection molding method according to the present invention.

FIG. 6 shows a primary foaming step subsequent to the above-described primary injection step. At this step, the pneumatic cylinder 16 is driven to move the mold element 15 backward, thereby expanding the primary initial cavity 30 so as to form a final cavity 31 having a volume approximately double that of the primary initial cavity 30, and primary foaming is carried out. By this step, a primary foam injection-molded part 32 is formed.

Figure 7:
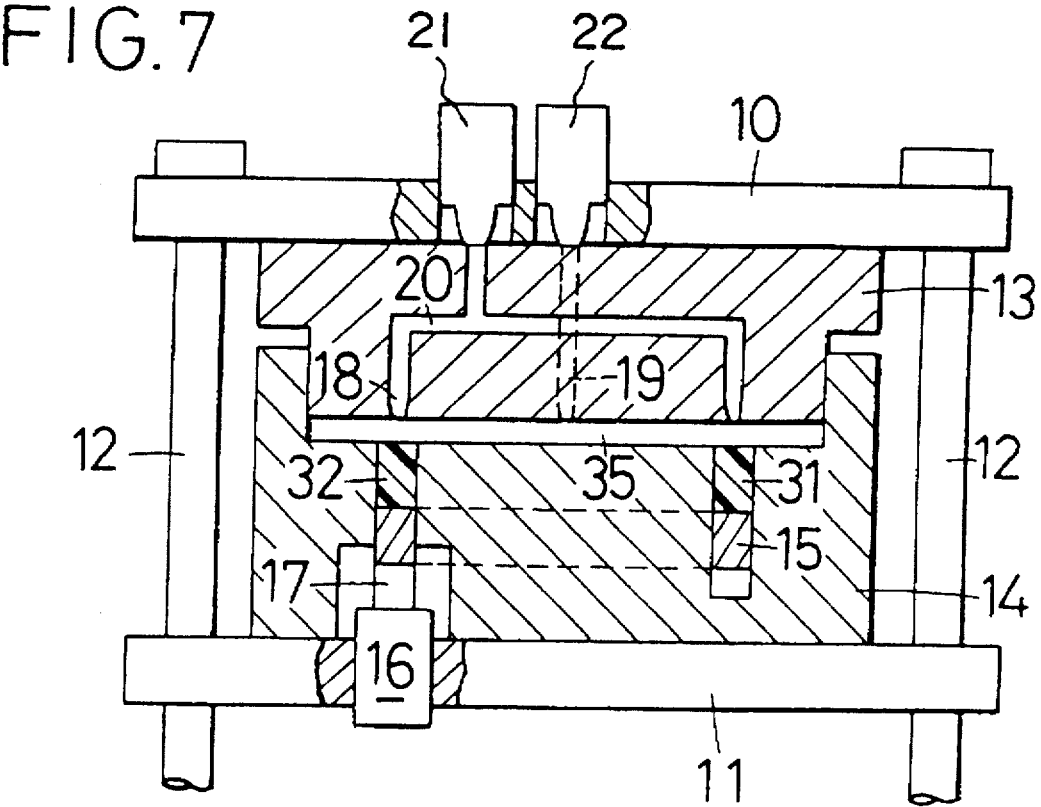
FIG. 7 is a sectional front view showing a further step of the first embodiment of the heterogeneous foam injection molding method according to the present invention.

Next, the movable platen 11 is moved backward. Consequently, as shown in FIG. 7, the mold element 14, the mold element 15, the pneumatic cylinder 16, and the primary foam injection-molded part 32 in the primary initial cavity 30 move backward together with the movable platen 11. As a result of the backward movement, a secondary initial cavity 35 is formed by the end surface of the mold element 13 that faces the mold element 14, the end surface of the mold element 14 that faces the mold element 13, and the end surface of the primary foam injection-molded part 32 that faces the mold element 13.

FIG. 8 shows a secondary injection step. A secondary molding material is injected into the secondary initial cavity 35 from the secondary injection pipe 22 through the secondary gate 19. FIG. 9 shows a secondary foaming step subsequent to the secondary injection step. At this step, the movable platen 11 is moved backward to expand the secondary initial cavity 35 so as to form a final cavity 36 having a volume approximately double that of the secondary initial cavity 35, and secondary foaming is carried out. By this step, a secondary foam injection-molded part 37 is formed.

In the process of forming the secondary foam injection-molded part 37, bubbles permeate into small voids in the foam structure of the primary foam injection-molded part 32 and fusion-bond thereto by their own heat, thereby enabling a firm, integrally molded product to be formed from the primary and secondary foam injection-molded parts 32 and 37. Next, the movable platen 11 is moved backward to separate the mold elements 13 and 14 from each other, and the damper 1 as a heterogeneous foam injection-molded part is removed in the same way as in the case of the removal of a molded part from a conventional injection molding machine.

Second Embodiment

Figure 14:
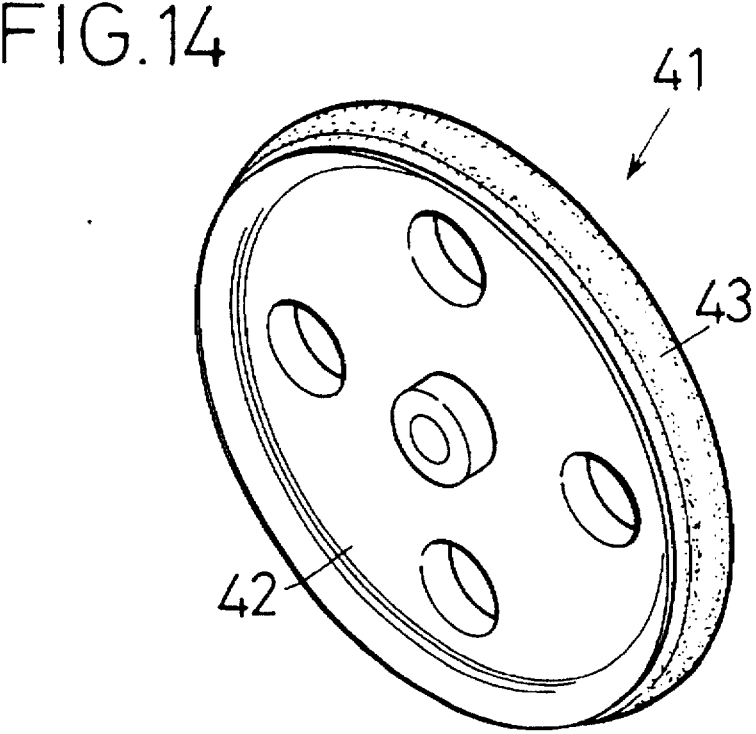
FIG. 14 is an oblique projection of an example of an article produced by the second embodiment of the heterogeneous foam injection molding method according to the present invention.
Figure 11:
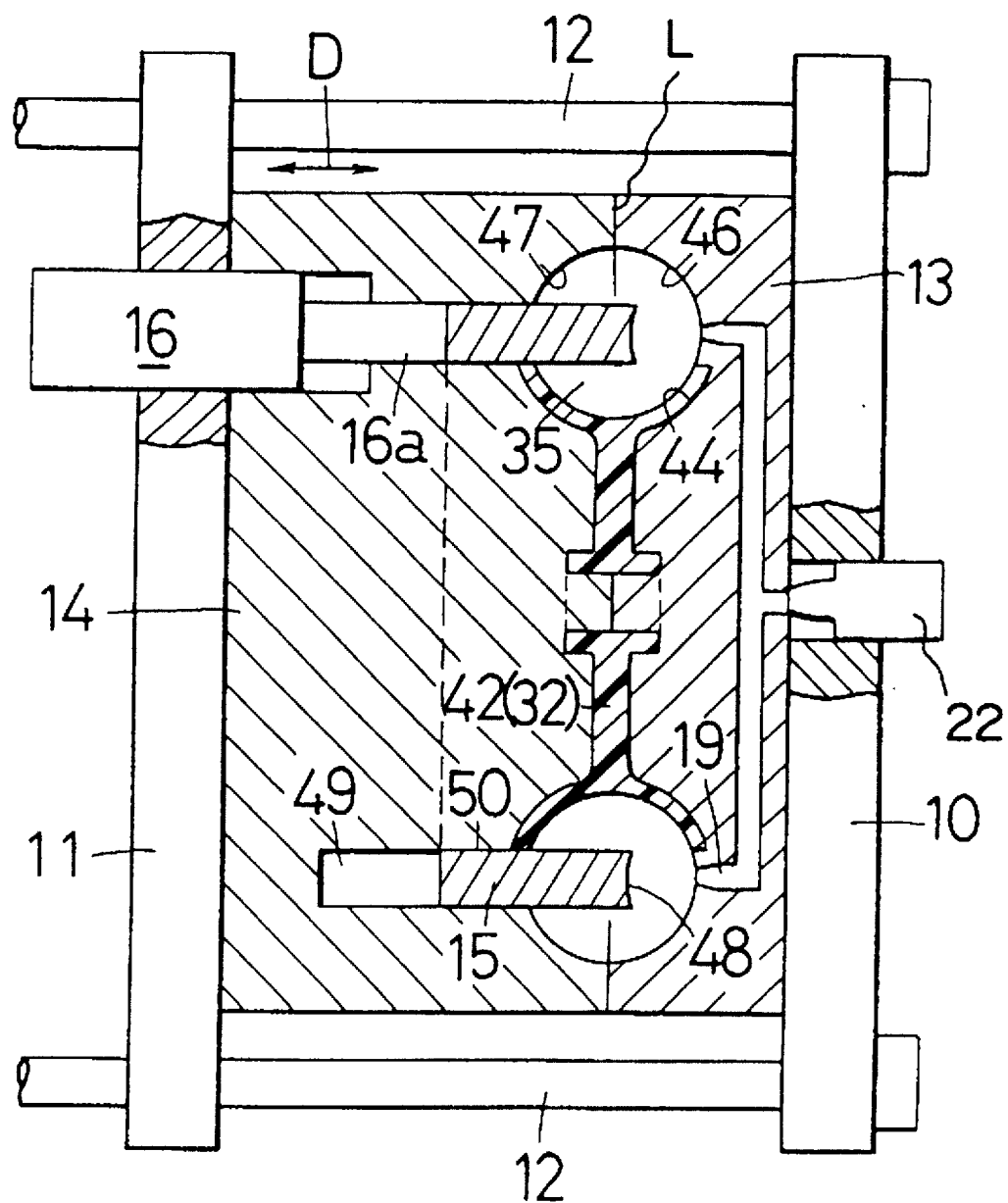
FIG. 11 is a sectional front view showing a first step of a second embodiment of the heterogeneous foam injection molding method according to the present invention.
Figure 12:
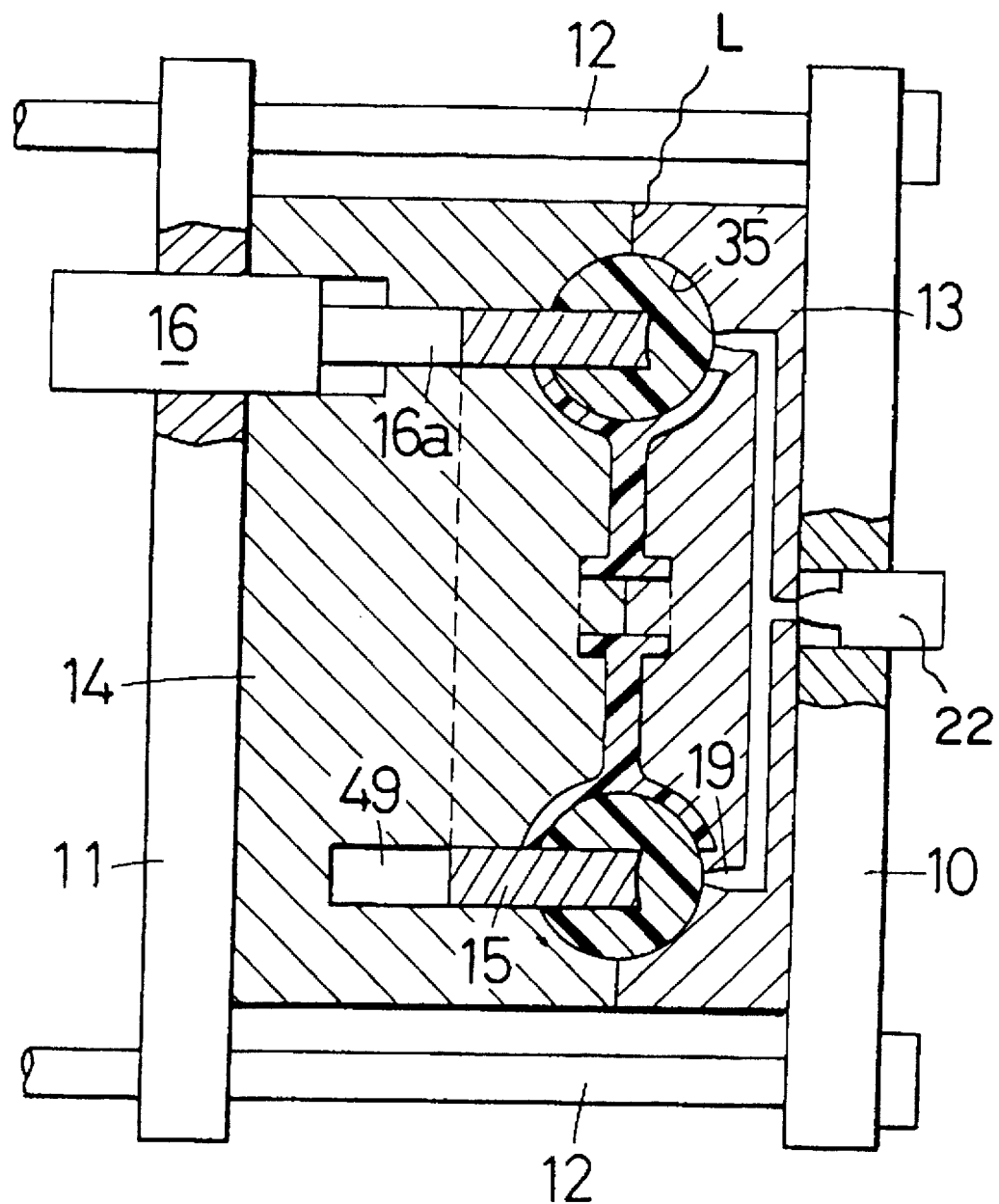
FIG. 12 is a sectional front view showing another step of the second embodiment of the heterogeneous foam injection molding method according to the present invention.
Figure 13:
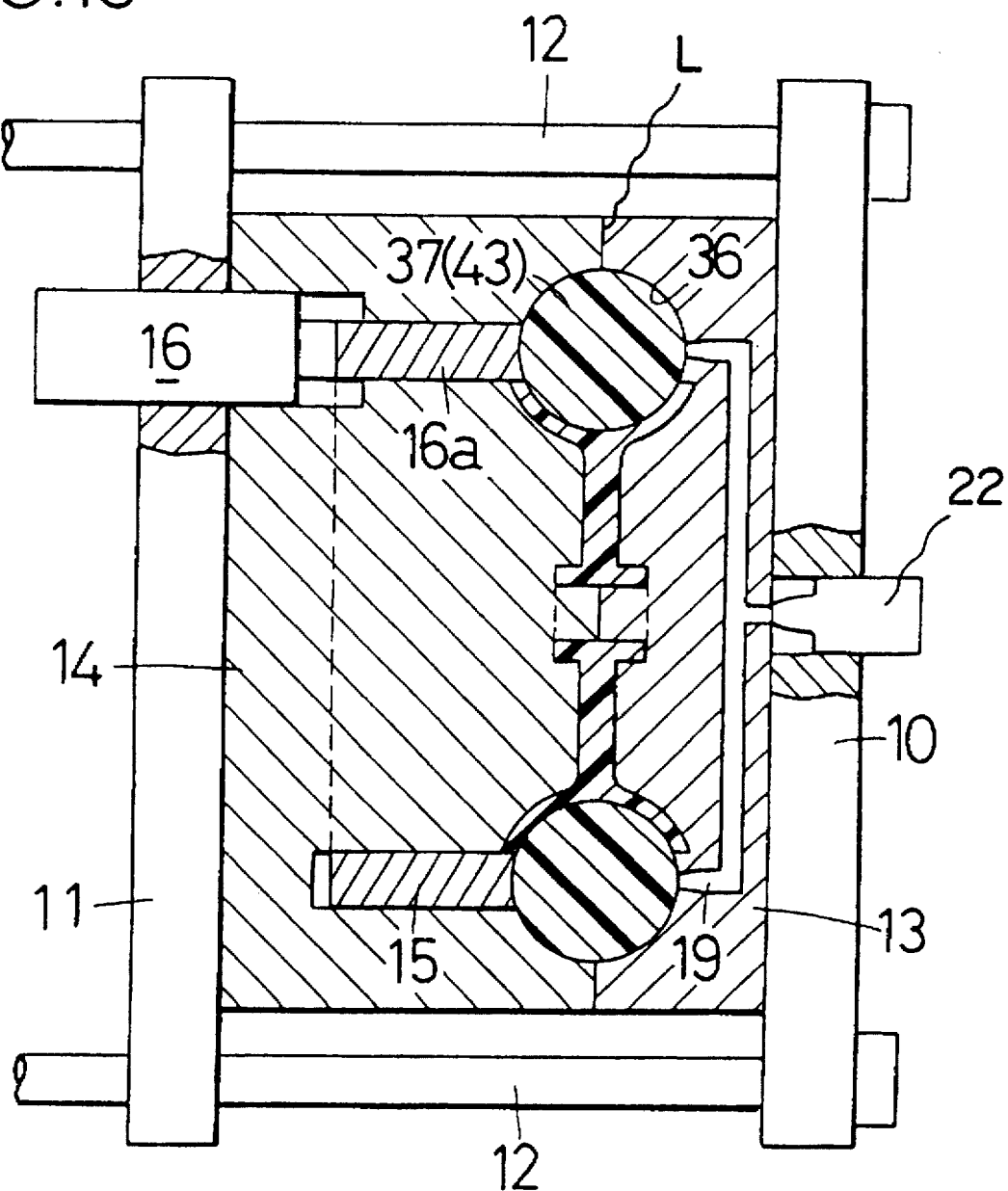
FIG. 13 is a sectional front view showing still another step of the second embodiment of the heterogeneous foam injection molding method according to the present invention.

FIGS. 11 to 13 are sectional front views showing the operation of a fundamental injection molding device for carrying out the heterogeneous foam injection molding method of the present invention as a second embodiment according to the process sequence. FIG. 14 shows a bicycle wheel 41 produced by the second embodiment of the present invention. As shown in FIG. 14, the bicycle wheel 41 is an integral member composed of a wheel body 42 and a shock-absorbing wheel 43. The wheel body 42 is molded of a rigid engineering plastic material, which is not subjected to foam molding process. The shock-absorbing wheel 43 is a foam injection-molded part having a partial torus surface 44 (see FIG. 11).

The injection molding machine that is shown in FIG. 11 has a mold element 13 secured to a stationary platen 10, a mold element 14 secured to a movable platen 11, and a mold element 15 which is movable relative to the mold element 14. As shown in FIG. 11, the wheel body 42, which has previously been formed as a primary molded part in another process, is clamped between the mold elements 13 and 14 closed to each other. The primary molded part is formed by injecting a primary molding material into a primary cavity (not shown) formed by a mold of another injection molding machine (not shown).

A closed secondary cavity is formed by the partial torus surface 44 of the primary molded part 42, a partial torus surface 46 of the mold element 13 on the side thereof which faces the mold element 14, a partial torus surface 47 of the mold element 14 on the side thereof which faces the mold element 13, and the peripheral surface of the mold element 15. The peripheral surface of the mold element 15 is comprised of a partial torus surface 48 and a sliding surface 50 which slides on the wall of an annular groove 49 provided in the mold element 14. The mold element 15 is inserted in the annular groove 49 of the mold element 14.

The two cavity forming surfaces 46 and 47 of the mold elements 13 and 14 intersect each other at a line L, and portions of the cavity forming surfaces 46 and 47 which are in the vicinity of the intersection line L are formed from surfaces which are not parallel to the direction D of movement of the two mold elements 13 and 14, that is, torus surfaces.

Next, the second embodiment of the heterogeneous foam injection molding method will be explained. As shown in FIG. 11, the wheel body 42 as a primary foam injection-molded part 32 is inserted into the mold element 13, and the mold element 14 is moved forward to clamp the wheel body 42 between the mold elements 13 and 14. Then, the pneumatic cylinder 16 is driven to move the mold element 15, which is integrally provided on the piston rod 16a, forward to an advance position, as shown in FIG. 11. At this advance position, the closed secondary initial cavity 35 is formed by the partial torus surface 44 of the primary molded part 42, the partial torus surface 46 of the mold element 13, the partial torus surface 47 of the mold element 14, and the peripheral surface 48 and 50 of the mold element 15.

FIG. 12 shows a secondary injection step. A secondary molding material is charged into the secondary initial cavity 35 from the secondary injection pipe 22 through the secondary gate 19. FIG. 13 shows a secondary foaming step subsequent to the secondary injection step. At this step, the mold element 15 is moved backward to expand the secondary initial cavity 35 so as to form a final cavity 36 having a volume approximately double that of the secondary initial cavity 35, and secondary foaming is carried out. By this step, a secondary foam injection-molded part 37 is formed. The secondary foam injection-molded part 37 corresponds to the shock-absorbing wheel 43.

In the process of forming the secondary foam injection-molded part 37, bubbles permeate into small voids in the foam structure of the primary foam injection-molded part 32 and fusion-bond thereto by their own heat, thereby enabling a firm, integrally molded product to be formed from the primary foam injection-molded part 32 and the secondary foam injection-molded part 37. Next, the movable platen 11 is moved backward to separate the mold elements 13 and 14 from each other, and the bicycle wheel 41 as a heterogeneous foam injection-molded part is removed in the same way as in the case of the removal of a molded part from a conventional injection molding machine.

Third Embodiment

Figure 15:
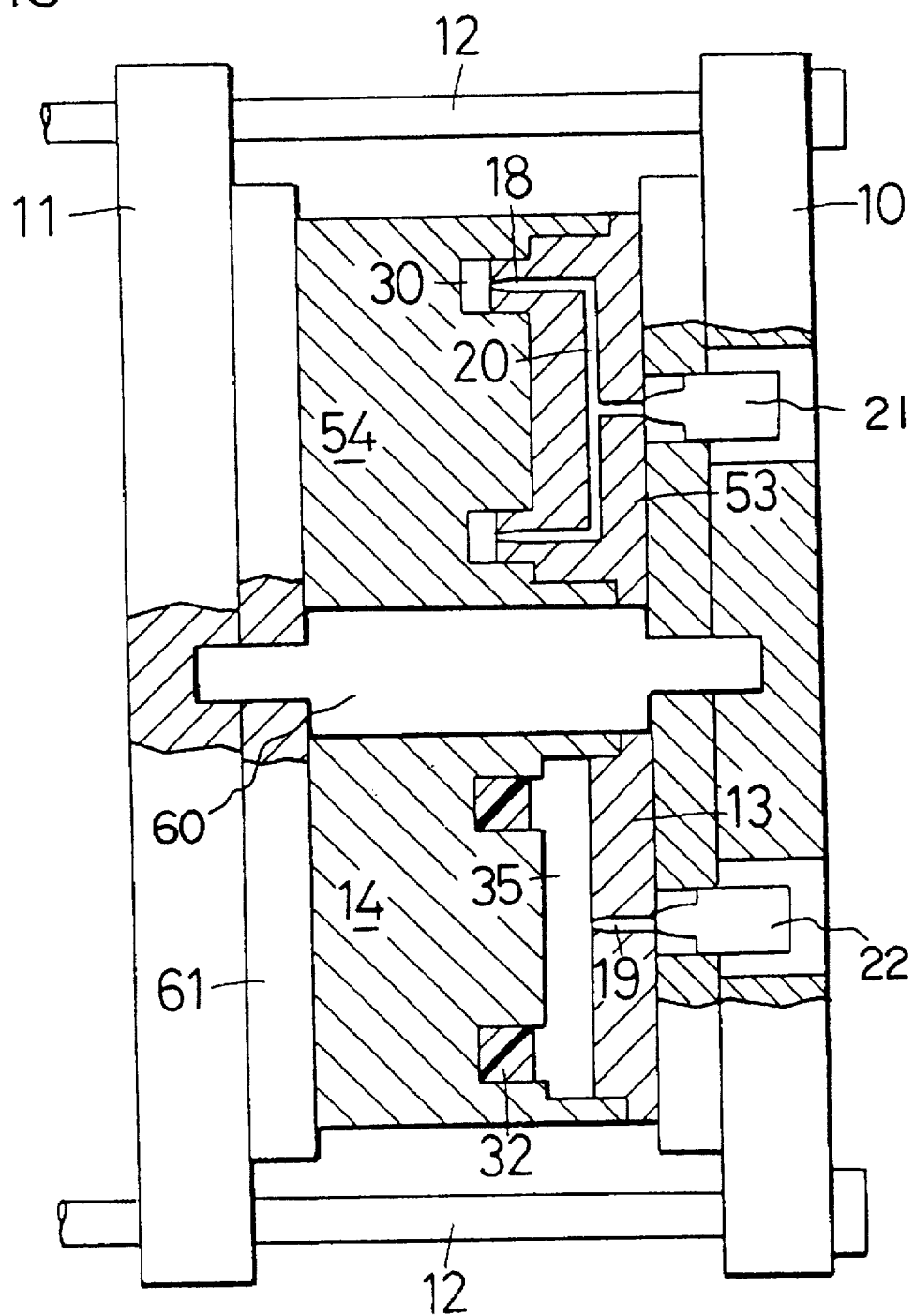
FIG. 15 is a sectional front view showing a first step of a third embodiment of the heterogeneous foam injection molding method according to the present invention.
Figure 17:
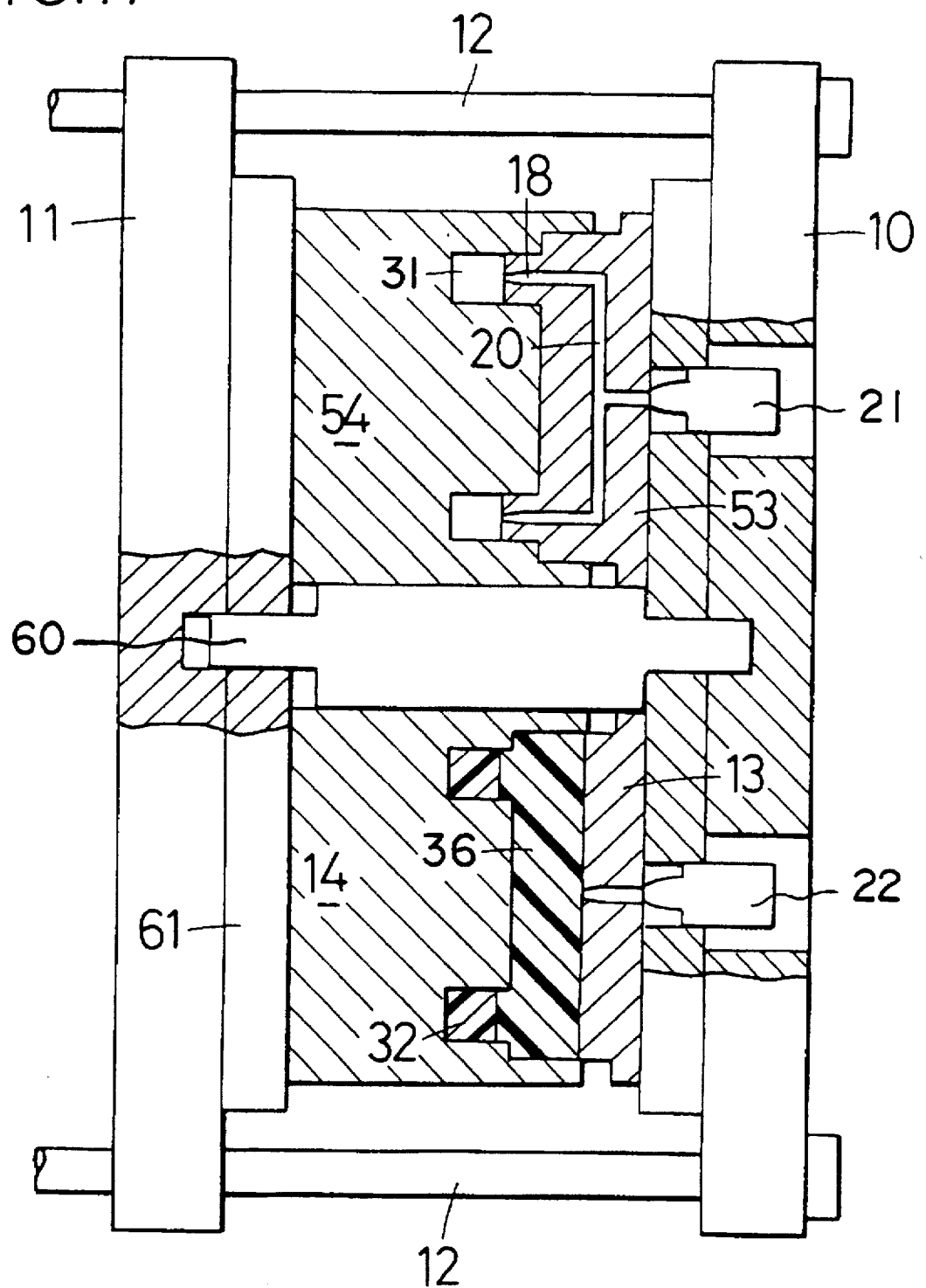
FIG. 17 is a sectional front view showing another step of the third embodiment of the heterogeneous foam injection molding method according to the present invention.

FIGS. 15 and 17 are sectional front views showing the operation of a fundamental injection molding device for carrying out the heterogeneous foam injection molding method of the present invention as a third embodiment according to the process sequence. In contrast to the first and second embodiments, in which a core-back type injection molding machine is employed, the third embodiment employs a rotary injection molding machine. The injection molding machine shown in FIG. 15 is an improvement over the conventional rotary injection molding machine in the arrangement of mold elements.

Figure 16:
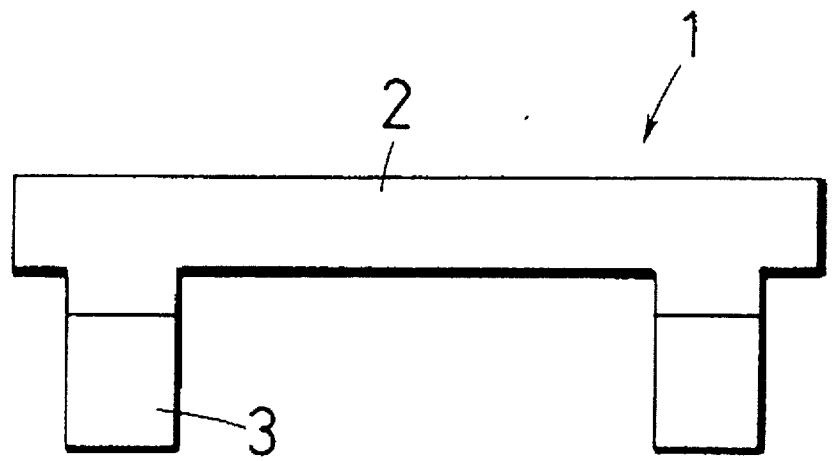
FIG. 16 is an oblique projection of an example of an article produced by the third embodiment of heterogeneous foam injection molding method according to the present invention.

FIG. 16 shows a heterogeneous foam injection-molded part produced by the third embodiment, which is a damper 1 approximately similar to the damper 1 of an automotive air conditioner, shown in FIG. 10. The damper 1 shown in FIG. 16 is also composed of a damper body 2 and a cushioning member 3. The cushioning member 3 is integrally formed in an annular square shape on one side of the damper body 2, which has a plate-like configuration.

The injection molding machine shown in FIG. 15 has two sets of mold elements. Two stationary mold elements 53 and 13 are attached to a stationary platen 10. A movable platen 11 is guided by a plurality of guide rods 12 to move forward and backward relative to the stationary platen 10. A central rotating shaft 60 is stretched between the stationary platen 10 and the movable platen 11. A rotary table 61 is rotatably supported on the rotating central shaft 60 at an end thereof which is closer to the movable platen 11. Two movable mold elements 54 and 14 are attached to the rotary table 61.

A primary initial cavity 30 is formed by the mold elements 53 and 54, which slide relative to each other in an engaged state. The mold element 13 is provided with a primary gate 18. The primary gate 18 is connected to an injection nozzle of a primary injection pipe 21 through a runner 20.

The mold element 14 has the same configuration as that of the mold element 54. The mold element 13, which is fitted to the mold element 14, is provided with a secondary gate 19. The secondary gate 19 is connected to an injection nozzle of a secondary injection pipe 22. The mold element 14 has a primary foam injection-molded part 32 inserted therein. A secondary initial cavity 35 is formed by the mold element 14, the primary foam injection-molded part 32, and the mold element 13.

FIG. 15 shows primary and secondary initial cavity forming steps, which take place simultaneously. At the same time as the primary initial cavity 30 is formed by the mold elements 53 and 54, the secondary initial cavity 35 is formed by the primary foam injection-molded part 32 and the mold elements 14 and 13. Primary and secondary molding materials are simultaneously or almost simultaneously injected into the primary and secondary initial cavities 30 and 35 from the primary and secondary gates 18 and 19, respectively. The primary and secondary molding materials are similar to those in the first embodiment.

As shown in FIG. 17, the movable platen 11 is moved backward. The rotary table 61 and the mold elements 54 and 14 move backward together with the movable platen 11. The backward movement causes the primary and secondary initial cavities 30 and 35 to expand and form primary and secondary final cavities 31 and 36, respectively, which have volumes approximately double those of the primary and secondary initial cavities 30 and 35. The primary and secondary molding materials are foamed in the primary and secondary final cavities 31 and 36, the volumes of which are approximately double those of the primary and secondary initial cavities 30 and 35. Thus, a primary foam injection-molded part 32 and a secondary foam injection-molded part 37 are formed.

Next, the movable platen 11 is moved backward, and the damper 1 as a heterogeneous foam injection-molded part, shown in FIG. 16, is removed from the mold elements 13 and 14 by a conventional device. The primary foam part 32 is held by the mold element 54. The rotary table 61 is rotated by a conventional device (not shown) to move the mold element 54 to a position which faces the mold element 13 and also move the mold element 14 to a position which faces the mold element 53. Thereafter, the movable platen 11 is moved forward. Consequently, the state shown in FIG. 15 is obtained again, thus completing one heterogeneous foam injection molding cycle.

Fourth Embodiment

FIG. 23 shows a damper 1 of an automotive air conditioner which is produced by a fourth embodiment of the present invention. The damper 1 shown in FIG. 23 is partly similar to but different as a whole from the automotive air conditioner dampers produced by the first and third embodiments, which are shown in FIGS. 10 and 16. The damper 1 produced by the fourth embodiment has cushioning members 3 on both sides of a damper body 2. The cushioning members 3 on both sides of the damper body 2 are connected by gate filler members 71 of the same material as that of the cushioning members 3, which penetrate through the damper body 2 at a plurality positions.

Figure 18:
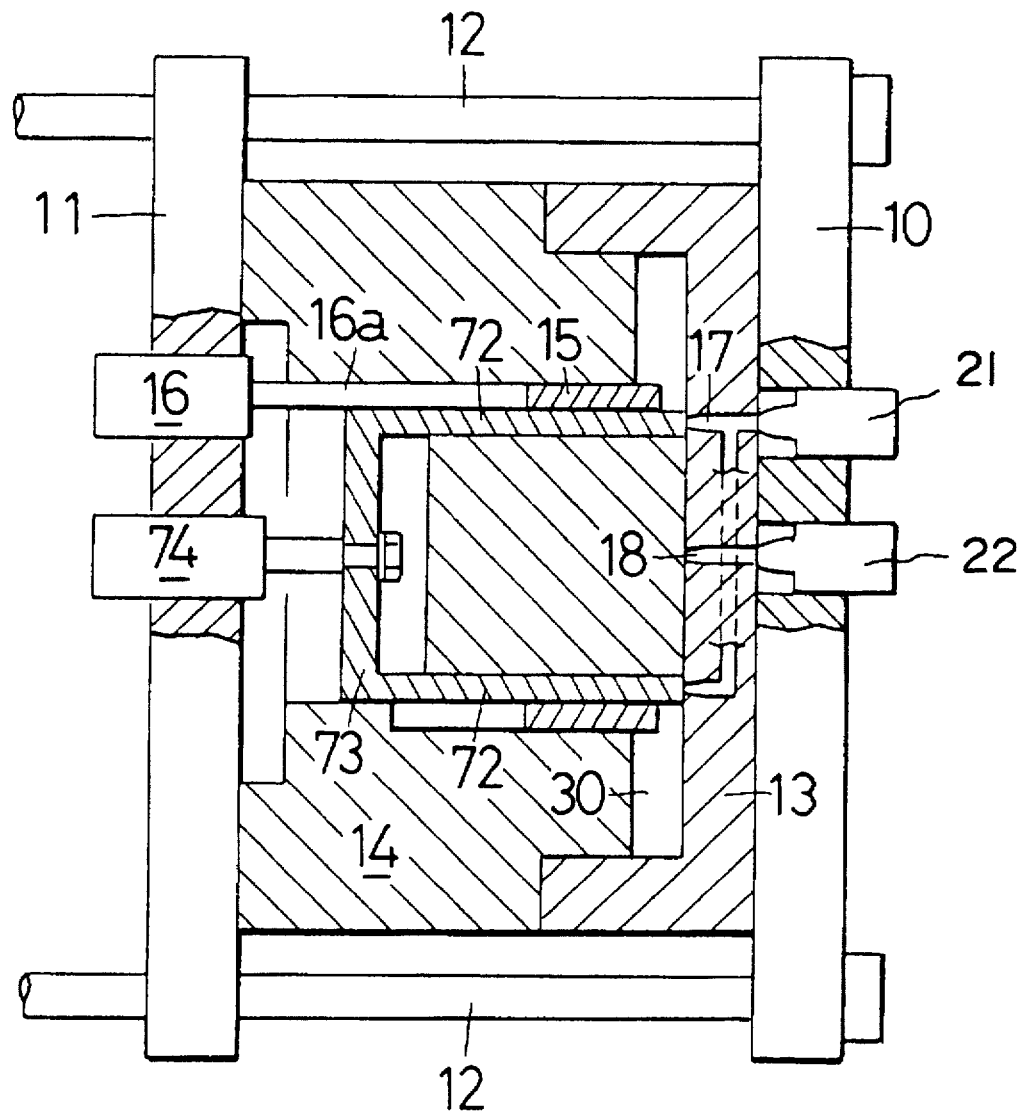
FIG. 18 is a sectional front view showing a first step of a fourth embodiment of the heterogeneous foam injection molding method according to the present invention.

FIG. 18 shows a mold assembly used to mold the automotive air conditioner damper 1 by the fourth embodiment. The mold assembly includes a stationary platen 10, a movable platen 11, a plurality of guide members 12 for guiding forward and backward movement of the movable platen 11 relative to the stationary platen 10, a mold element 13 secured to the stationary platen 10, a mold element 14 secured to the movable platen 11, and a mold element 15 which slides relative to the mold element 14 to thereby move forward and backward. That is, the arrangement of the mold assembly is similar to those of the injection molding machines used in the first, second and third embodiments.

In the fourth embodiment, a plurality of gate forming pins 72 are additionally provided. The gate forming pins 72 slide on the inner peripheral surface of the annular mold element 15, which is a flat surface, to thereby move forward and backward. The gate forming pins 72 are secured to a moving plate 73 with their proximal end portions buried therein. The moving table 73 slides on the cylindrical inner peripheral surface of the mold element 14 to thereby move forward and backward. The gate forming pins 72 extend from the moving plate 73 in the direction of movement of the moving plate 73. The moving plate 73 is driven by an air cylinder 74 that is provided in the movable platen 11.

FIG. 18 shows an initial cavity forming step of the heterogeneous foam injection molding process. An approximately disk-shaped primary initial cavity 30 is formed by the end surface of the mold element 13 that faces the mold element 14, the end surface of the mold element 14 that faces the mold element 13, the mold element 15, and the gate forming pins 72. A primary molding material containing a blowing agent is injected into the thus formed primary initial cavity 30 from the injection nozzle of the primary injection pipe 21 through the primary gate 18.

Figure 19:
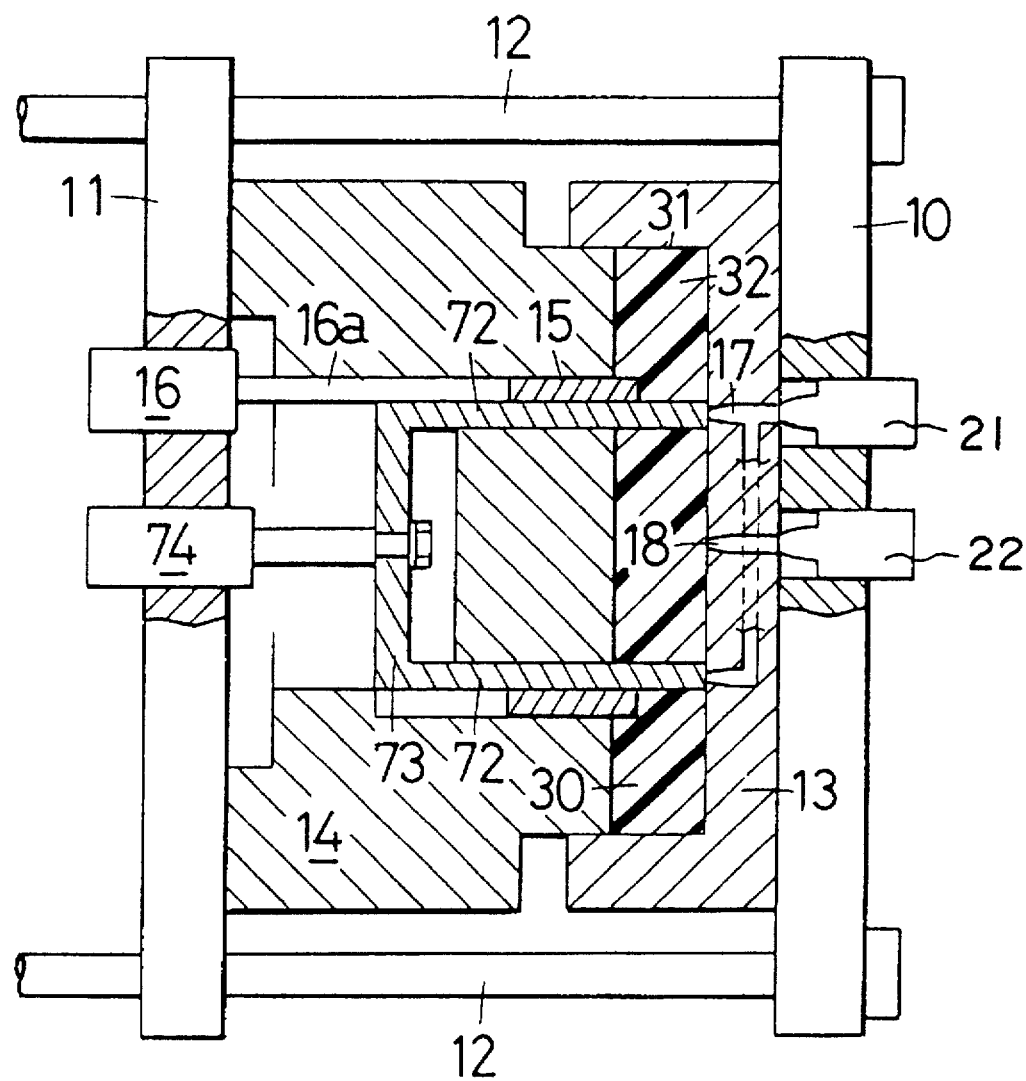
FIG. 19 is a sectional front view showing another step of the fourth embodiment of the heterogeneous foam injection molding method according to the present invention.

FIG. 19 shows a primary foaming step. At this step, the movable platen 11 is moved backward to expand the primary initial cavity 30 so as to form a primary final cavity 31 having a volume approximately double that of the primary initial cavity 30, and primary foaming is carried out. By this step, a primary foam injection-molded part 32 is formed. At this step, the mold element 14, the pneumatic cylinder 16, the piston rod 16a, the mold element 15, the air cylinder 74, the moving plate 73, and the gate forming pins 72 move backward by equal distances together with the movable platen 11.

Figure 20:
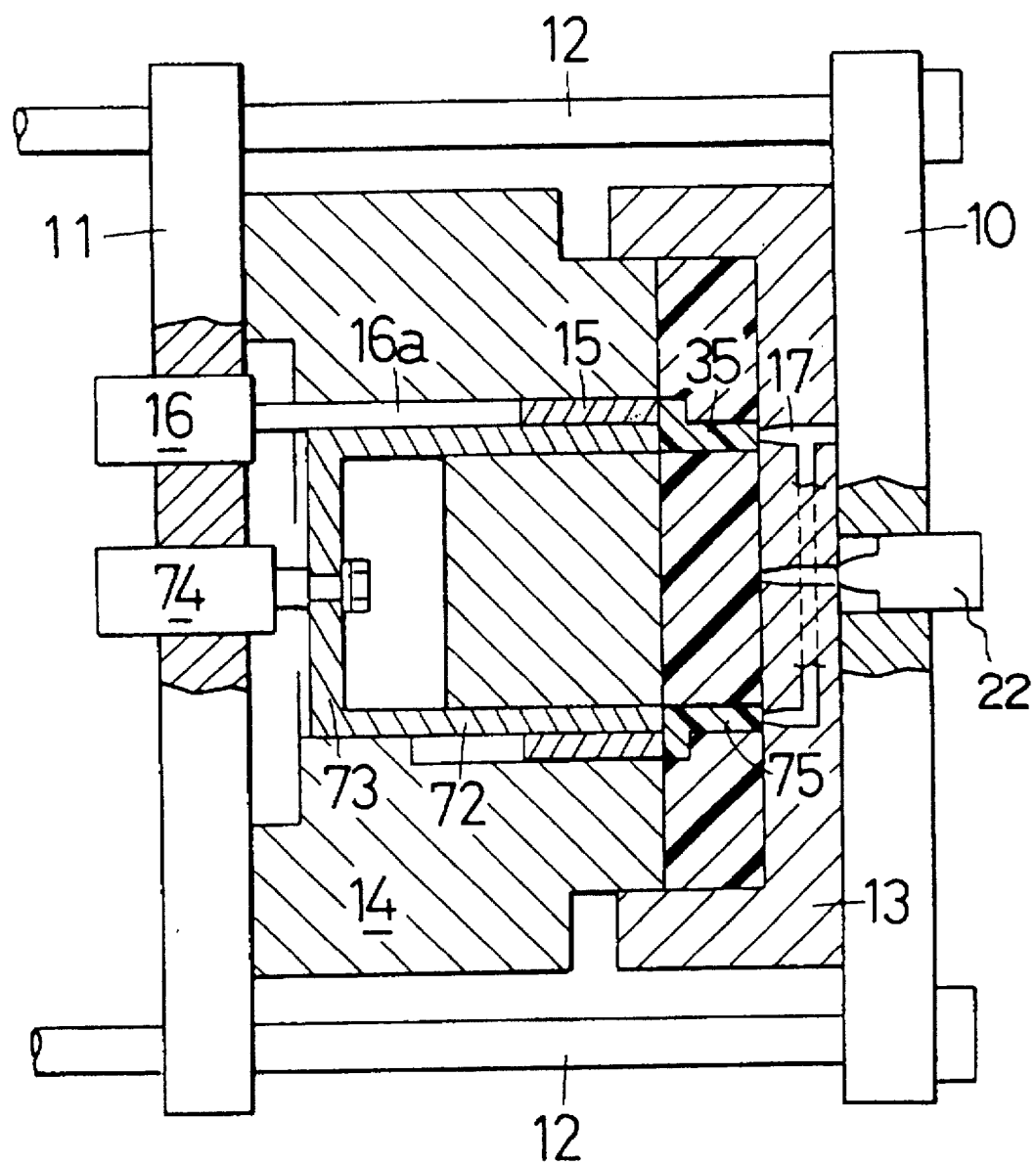
FIG. 20 is a sectional front view showing still another step of the fourth embodiment of the heterogeneous foam injection molding method according to the present invention.

Next, the pneumatic cylinder 16 is driven to move the piston rod 16a backward. The backward movement of the piston rod 16a causes the mold element 15 to move backward together with the piston rod 16a, as shown in FIG. 20. As a result, the forward end surface of the mold element 15 becomes flush with the cavity forming surface of the mold element 14 on the side thereof which faces the mold element 13. At the same time as the mold element 15 moves backward, the air cylinder 74 is driven to move the moving table 73 backward. As a result, the forward end surfaces of the gate forming pins 72 also become flush with the cavity forming surface of the mold element 14.

Figure 22:
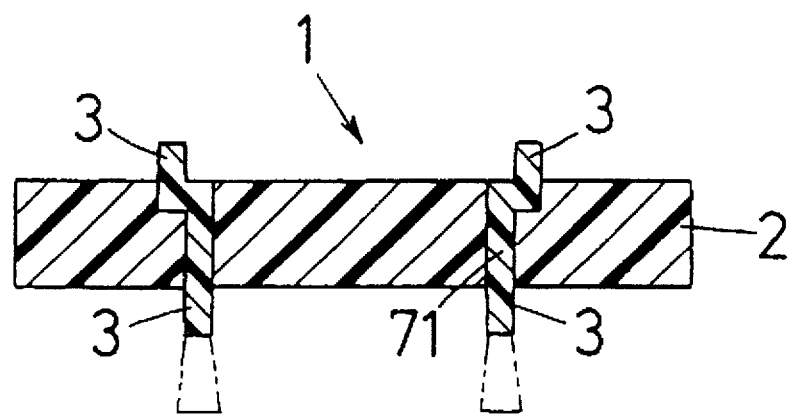
FIG. 22 is a sectional view of an example of an article produced by the fourth embodiment of the heterogeneous foam injection molding method according to the present invention.
Figure 21:
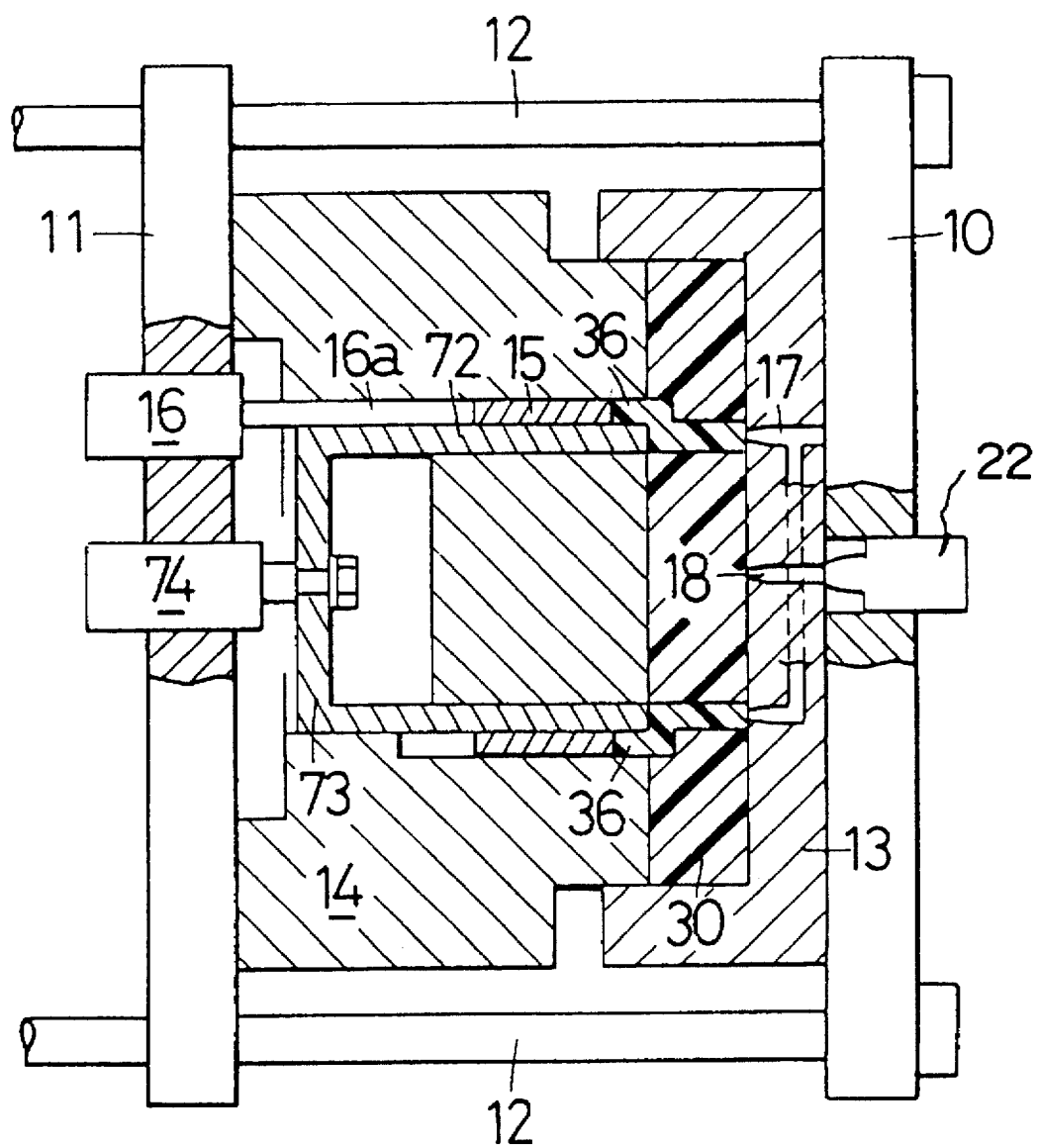
FIG. 21 is a sectional front view showing a further step of the fourth embodiment of the heterogeneous foam injection molding method according to the present invention.

As a result of the backward movement of the mold element 15 and the gate forming pins 72, a secondary initial cavity 35 is formed by the mold element 15 and the primary foam injection-molded part 32. Further, molding gates 75 which are connected to a secondary gate 17 are defined by spaces in the primary foam injection-molded part 32 which are left after the gate forming pins 72 have come out of the primary foam injection-molded part 32. A secondary molding material is injected from the secondary gate 17. As shown in FIG. 20, the secondary molding material supplied from the secondary gate 17 is injected into the secondary initial cavity 35 through the molding gates 75. Subsequently to the secondary injection step, the pneumatic cylinder 16 is driven to further move the mold element 15 backward through the piston rod 16a, thereby forming a secondary final cavity 36, as shown in FIG. 21. The secondary molding material is foamed in the secondary final cavity 36 to form a secondary foam injection-molded part, as shown in FIG. 22. With the movable platen 11 sufficiently moved backward, the secondary foam injection-molded part shown in FIG. 22 is removed from the mold, and that portion of the foam injection-molded part which has been formed in the secondary gate 17 is cut off, thus producing a damper 1 as a heterogeneous foam injection-molded part in which annular cushioning members 3 are provided on both sides of a damper body 2.

Other Embodiments

It should be noted that the present invention is not necessarily limited to the foregoing embodiments, and that design changes may be made within the scope of the invention. For example, it is possible to adopt known measures whereby a three-plate injection mold is used with a view to removing the runner.

The present invention provides the following advantageous effects: A material or product which simultaneously has elasticity, flexibility, cushioning properties and toughness can be produced at low cost by virtue of the mass-production properties of two-color injection molding, and at the same time, it is possible to stabilize the quality of a product formed by uniting together two materials having different properties. In the heterogeneous foam injection-molded part, the boundary surface between the two foam injection-molded parts forms a strong joint surface by the engagement between the foam structures of the two molded parts.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A heterogenous foam injecting molding method comprising the steps of:

forming a primary initial cavity by the cooperation of at least three separate mold elements including a fixed first element, a second element movable with respect to a third element and said third element being movable with respect to said first element;

injecting a primary foamable molding material into the primary initial cavity formed by said primary initial cavity-forming step;

moving said second element with respect to said third element while keeping said cavity closed with said third element being at rest with respect to said first element to form a primary final cavity having a larger volumetric capacity than that of said primary initial cavity and foaming said charged molding material injected into said primary initial cavity in said primary final cavity to produce a primary injection molded part;

thereafter, forming a secondary initial cavity by a cooperation among said first element, said third element and said primary injection molded part;

injecting a secondary molding material, different from that forming said primary injection molded part, into said second initial cavity formed by said secondary initial cavity forming step;

moving at least said third element and said primary injection molded part contained therein with respect to said first element while keeping the cavity closed to form a secondary final cavity having a larger volumetric capacity than that of said secondary initial cavity and foaming said charged secondary molding material injected into said secondary initial cavity in said secondary final cavity to form a secondary injection-molded part integral with said primary injection molded part.

* * * * *